United States Patent

[11] 3,557,861

| [72] | Inventor | Victor Duquesne |
| | | 42-44 Quellinstr., Antwerp, Belgium |
| [21] | Appl. No. | 711,762 |
| [22] | Filed | Mar. 8, 1968 |
| [45] | Patented | Jan. 26, 1971 |
| [32] | Priority | Feb. 14, 1968 |
| [33] | | Belgium |
| [31] | | 47685 |

[54] APPARATUS FOR FIXING WHEELS OF VEHICLES FROM WHICH A TIRE HAS TO BE REMOVED
7 Claims, 5 Drawing Figs.

[52] U.S. Cl. ............................................... 157/1.24
[51] Int. Cl. ............................................... B06c 25/06
[50] Field of Search ..................................... 157/1.24

[56] References Cited
UNITED STATES PATENTS

| 1,793,864 | 2/1931 | Manley ........................ | 157/1.24UX |
| 2,569,788 | 10/1951 | Weaver ........................ | 157/1.24 |
| 2,695,659 | 11/1954 | Athmann ...................... | 157/1.24 |
| 2,948,314 | 8/1960 | Bishman ....................... | 157/1.24X |
| 3,238,989 | 3/1966 | Silvestrani .................... | 157/1.24 |

Primary Examiner—Granville Y. Custer, Jr.
Attorney—Linton & Linton

ABSTRACT: The present apparatus is for retaining a wheel between moveable claws when it is necessary to remove or mount a tire thereon.

INVENTOR
VICTOR DUQUESNE

INVENTOR
VICTOR DUQUESNE
By Linton and Linton
ATTORNEYS

APPARATUS FOR FIXING WHEELS OF VEHICLES FROM WHICH A TIRE HAS TO BE REMOVED

This invention concerns an apparatus for holding the wheels of vehicles from which a tire has to be removed.

There are apparatuses on the upper part of which is fitted a rotary plate to which are attached, by means of pivots the ends of several jointed arms, at the other end of which is fixed a claw. Each arm passes through a guiding orifice provided in the chassis of the apparatus. The said rotary plate as well as the arms are situated immediately below a plate rigidly fixed to the chassis, which only allows the free ends of the arms and the claws to be seen.

Conical pinions and a threaded rod actuated by a crank make the plate rotate so that the arms slide in the guiding orifices. As a result of this, the claws come closer together or get further apart according to the diameter of the wheel to be held.

These apparatuses have however the disadvantages that it is not possible to bring the claws close together and clamp them against the rim of the wheel in a satisfactory manner and that the conical pinions are very costly.

In addition these apparatuses have also the disadvantage that the guiding holes provided in the chassis, to guide the arms, must be sufficiently large so that the arms can be guided in their most oblique position. Thereby the arms are only guided with considerable play. Furthermore the guiding holes in the chassis of the apparatus have to be milled, which is a costly operation.

On the other hand, these apparatuses also have the disadvantage of not being able to hold every type of wheel as the arms are covered by the plate fixed to the chassis and this plate is in the way of the disc of certain types of wheels in such a manner that the claws cannot grip the rim of the wheel.

In order to avoid these difficulties, to produce a simpler and less costly apparatus and on which a wheel can be held and clamped in an efficient manner, the mechanism to bring the claws closer together and to lock them against the rim of the wheel consists of a rod, one end of which is threaded which screws into a small block which pivots on a lug of the chassis of the apparatus. The center part of the rod in question is provided with a collar and is guided through a small block joined by means of a pivot to the rotary plate of the apparatus. In addition, each guiding element, for the guidance of an arm, consists of a small pivoting block provided with an adjusted hole through which slides the respective arm.

As an example and without any restrictions, there is given below a more detailed description of two possible ways, not in any way exclusive, of carrying out this apparatus in accordance with the present invention. This description refers to the annexed drawings in which.

Figure 1:
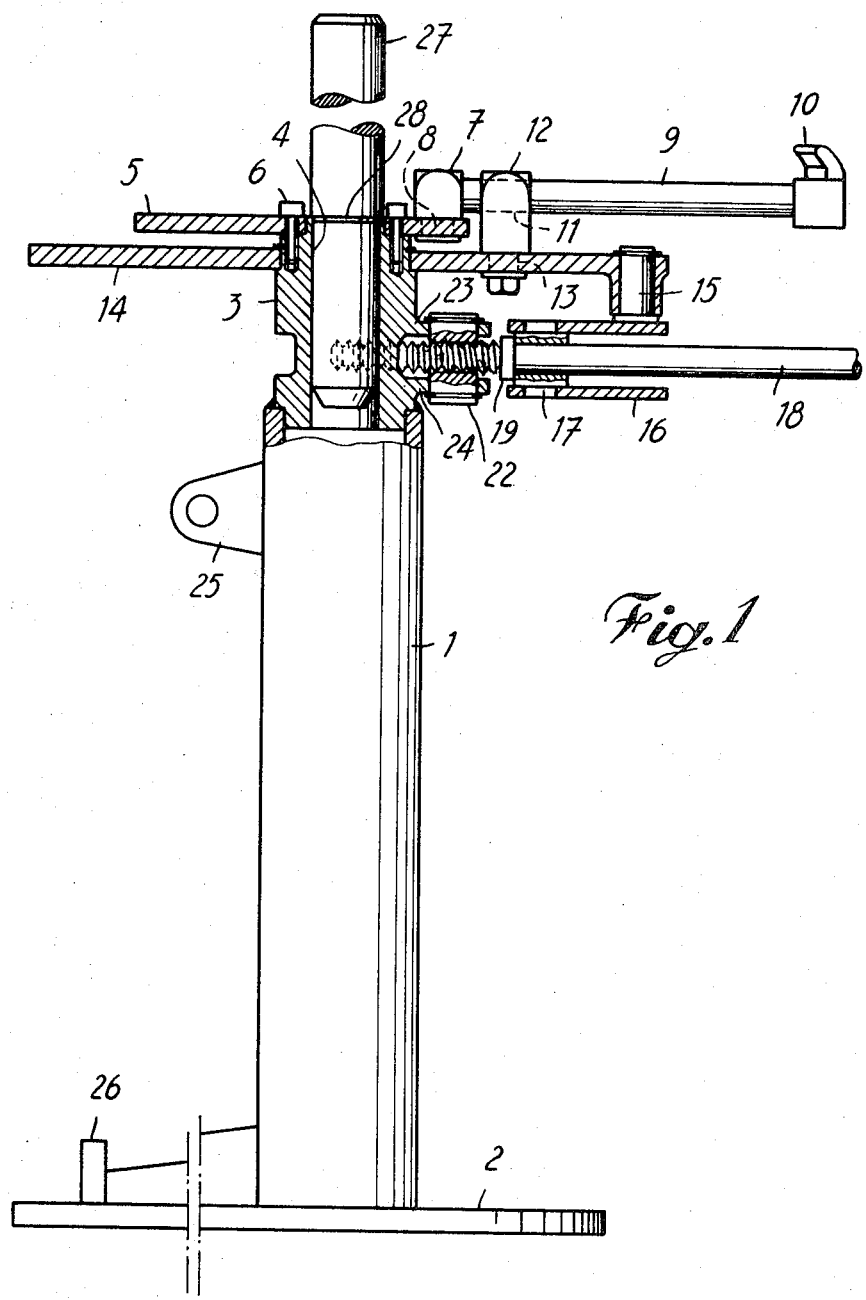
FIG. 1 represents a cross section of an apparatus taken along the line I–I of FIG. 2.
Figure 3:
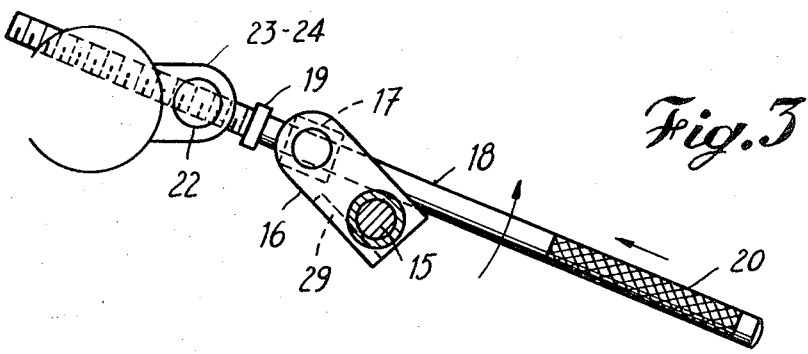
FIG. 3 represents a plan view of the control lever of this apparatus in an unclamped position.

The FIGS. 1 and 3 show that the apparatus is provided with a column 1 mounted on a base plate 2. At the upper part of the column is fixed, by welding, a sleeve 3 provided with a central orifice 4. A triangular plate 5 is fixed to this sleeve by means of screws 6. At each corner of this plate is fitted a block 7 that can pivot on the latter round its axle 8. In each of these blocks is fixed one end of an arm 9, the other end carrying a claw 10. The center part of each arm slides in the opening 11 of a small guiding block 12, mounted and pivoting on a circular plate 14 by means of an axle 13. This circular plate is mounted and moves freely round the sleeve 3 and carries near the edge a rotary pivot 15 on which is welded a connecting rod 16 consisting of two superposed small plates connected and maintained apart at a fixed distance by a side piece 29. This connecting rod, in turn, carries a small pivoting block 17, through which passes a rod 18, provided with a collar 19 and one end 20 of which is milled to be used as handle, the other end 21 being threaded. This latter end screws into a threaded passage through a pivot 22 mounted between the two lugs 23, 24 provided on the sleeve 3. On the column 1 there is a support 25 to which can be attached an apparatus to unstick the tires. A fastener 26 on the base plate 2 is provided to hold the wheel of which the tire has to be unstuck. The orifice 4 of the sleeve 3 may receive a supporting shaft 27 provided with a shoulder 28. This shaft is used as a rest for an instrument for the mounting or the dismounting of the tire, when the wheel is fixed on the apparatus described.

Figure 2:
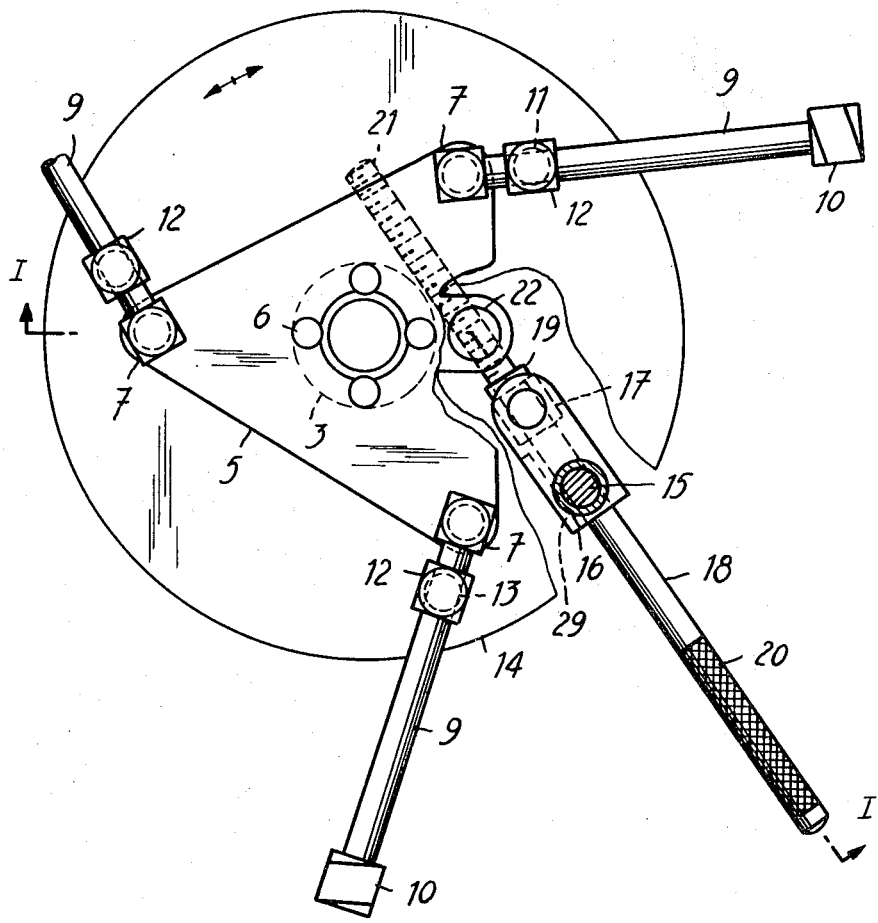
FIG. 2 represents a plan view of the apparatus, part of which has been cut away, in the clamped position.

When it comes to tightening a wheel on the apparatus, the wheel is placed on the arms 9 and between the claws 10. The rod end 20 is moved towards the bottom of FIG. 3 so that the pivot 22 turns between the lugs 23 and 24, as a result of which the block 17 of the connecting rod 16 slides along the rod 18 and the latter is pressed against the side 29 of the connecting rod 16. As a result of this, the above-mentioned connecting rod is drawn under a limited angle and practically immediately pulls on the pivot 15 of the rotary plate, consequently this plate rotates and the blocks 12 mounted on this plate, will move. As a result of the arms 9 being guided by the small blocks 12, the claws 10 will move towards the circumference of the wheel. As soon as the claws reach the wheel, the rod 18 is unscrewed from the pivot 22 so that the collar 19 comes up against the block 17 of the connecting rod 16. The rod 18 is then moved slightly in the opposite direction and unscrewed further from pivot 22, so that when the rod end 20 is moved again in the initial direction to the left in FIG. 2 the connecting rod comes into line with the rod 18, see FIG. 2, and a pressure is obtained between the block 17 and the collar 19. As a result of this, a pressure is brought into existence between the pivot 22 and the rotating pivot 15 which causes the claws 10 to press against the circumference of the wheel.

Figure 4:
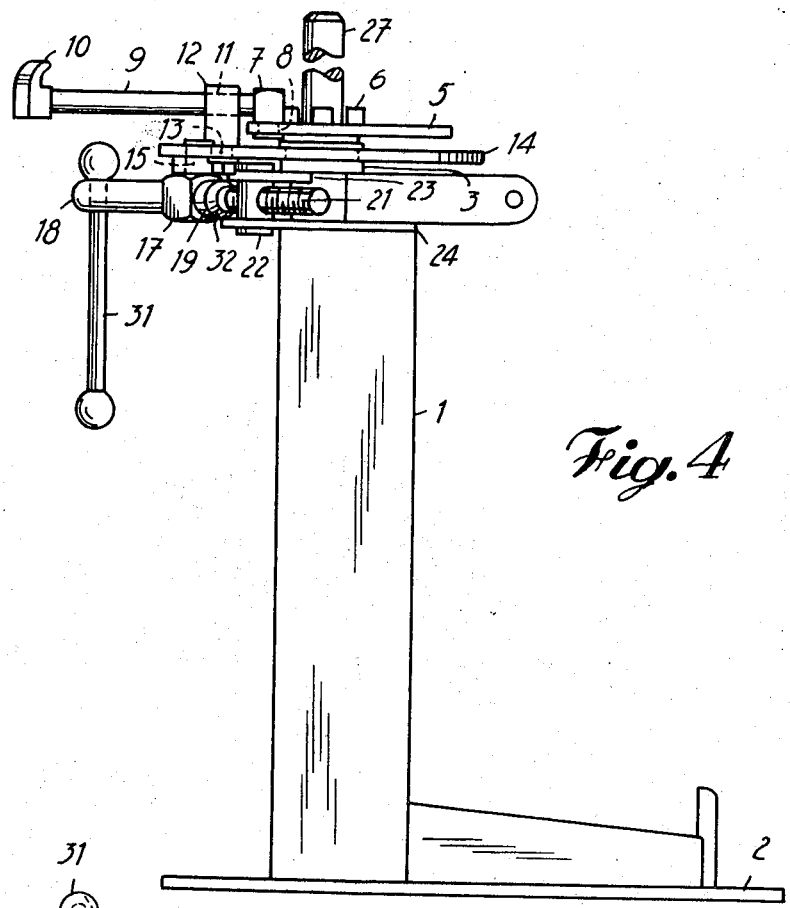
FIG. 4 represents a plan view of another simpler form of execution of the apparatus according to the invention.
Figure 5:
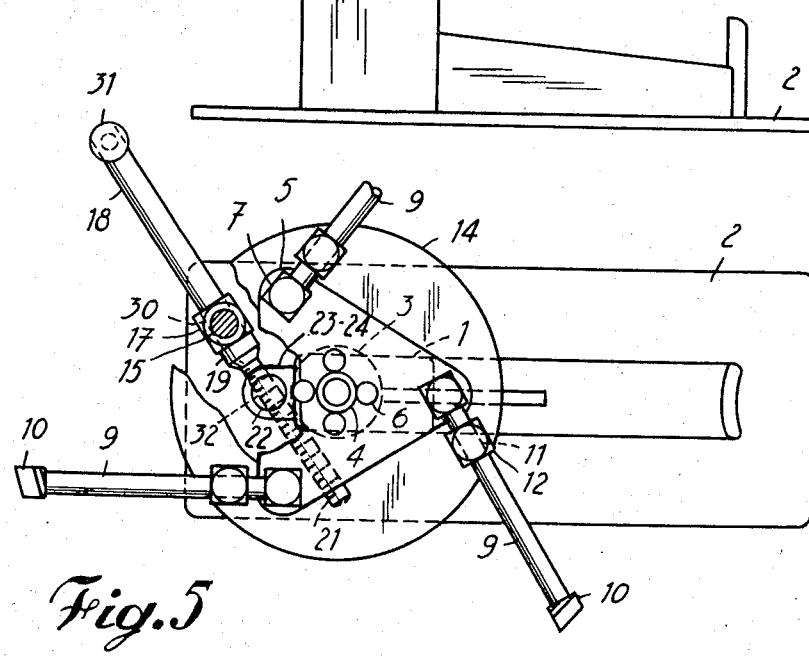
FIG. 5 represents a plan view of this apparatus, part of which has been cut away in a clamped position.

In another form of execution of the apparatus (FIG. 4 and 5), the apparatus also includes a column 1 mounted on a base plate 2. At the upper end of this column is fixed by welding a sleeve 3 provided with a central orifice 4. A triangular plate 5 is attached to this sleeve by means of a screw 6. At each corner of the said plate is fitted a block 7 that can pivot in the latter round its axis 8. To each of these blocks is fixed the end 9 of an arm provided at the other end with a claw. The central part of each arm slides in the opening 11 of a small guiding block 12 mounted and pivoting on a circular plate 14 by means of an axle 13. This plate is mounted on and moves freely round the sleeve 3 and also carries on its outer edge a rotary pivot 15 on which is fixed a block 17 provided with an orifice 30. In this orifice slides a rod 18 provided with a collar 19 and one end of which carries a lever 31 which slides perpendicularly to the rod 18 so that it never interferes with the arms 9. The other end 21 of this rod is threaded and screws into a threaded hole 32 of the pivot 22 mounted between the two lugs 23 and 24 of the sleeve 3. The orifice 4 of the sleeve 3 may receive a supporting shaft 27. This shaft is used as support for a tool for the mounting or dismounting of the tire when a wheel is fixed on the apparatus described.

When the apparatus is not in use, rod 18 is screwed towards pivot 22 and moved away from pivot 15 as shown by the arrows in FIG. 3 whereupon the pivots 22 and 15 and block 17 are out of line and hold the collar 19 of the rod 18 at a certain distance from the block 17 and the claws 10 are then too far apart for the fixing of the wheel. When it is required to fix a wheel on to the apparatus, it is placed on the arms 9 and between the claws 10. This being done, the rod 18 is moved horizontally so that the pivot 22 turns between the lugs 23 and 24 as a result of which the block 17 slides along the rod 18 and pulls the pivot 15 mounted on the edge of the rotary plate 14. It follows that the plate rotates and that the blocks 12 mounted on it will move. As a result of the arms 9 being guided by the small blocks 12, the claws will move towards the circumference of the wheel. As soon as the claws reach the wheel, by means of the movable lever 31 the rod 18 is unscrewed from the pivot 22 until the collar 19 comes up against the block 17 which clamps the apparatus and causes the efficient tightening of the claws 10 against the circumference of the wheel.

It stands to reason that some of the above mentioned pieces may be replaced by others which answer the same purpose and also that the shape, the dimensions and the relative arrangement of the different parts may vary.

I claim:

1. An apparatus for retaining a wheel comprising a vertical column, a horizontal plate fixed on said column, a plurality of arms, pivots connecting said arms to said fixed plate, each of said arms having a claw at one end, a second horizontal plate rotatably mounted on said column, a guiding block for each of said arms, provided with an opening with its respective arm extending through said opening and being pivotally mounted on said rotary plate, a block, a rod one end of which is in threaded engagement with said block, a lug attached to said vertical column and pivotally supporting said block, a collar on said rod, a second block in which said rod slideably extends, a pivot connecting said second block to said rotary plate and said collar limiting the movement of said rod in said second block.

2. An apparatus as claimed in claim 1, in which a pivot connects one end of said arms to said fixed plate, said fixed plate being positioned above said rotary plate, said rotary plate being wider than said fixed plate, and pivots on the circumference of said rotary plate connecting said guiding blocks thereto.

3 An apparatus as claimed in claim 1, in which said block for guiding said rod has a flat surface, said collar of said rod is positioned for moving against said block flat surface for clamping said claws on the rim of a wheel.

4. An apparatus as claimed in claim 1 including a connecting rod, said block for guiding said rod being pivotally attached to said connecting rod, said connecting rod being pivotally connected to said rotary plate with the pivoting axis of said connecting rod resting on said rotary plate and being able to be aligned with the axis of said rod.

5. An apparatus as claimed in claim 4, in which said pivotable connecting rod consists of two superposed plates and a side piece connecting and spacing said two plates.

6. An apparatus as claimed in claim 1, in which a crank is provided on the free end of said rod and said block for guiding said rod is pivotally mounted directly on said rotary plate.

7. An apparatus as claimed in claim 6, in which said crank consists of a lever slideably extending through said rod.